United States Patent [19]
Grimm et al.

[11] Patent Number: 6,117,971
[45] Date of Patent: Sep. 12, 2000

[54] PROCESS FOR RECYCLING HARDENED POLYSULPHIDE AND/OR POLYMERCAPTAN ADHESIVES AND SEALANTS

[75] Inventors: Stefan Grimm, Oftersheim; Karl-Heinz Pressel, Schoenau; Manfred Proebster, Nussloch, all of Germany

[73] Assignee: Henkel-Teroson GmbH, Germany

[21] Appl. No.: 08/983,411

[22] PCT Filed: Jun. 7, 1996

[86] PCT No.: PCT/EP96/02488

§ 371 Date: Dec. 12, 1997

§ 102(e) Date: Dec. 12, 1997

[87] PCT Pub. No.: WO97/00283

PCT Pub. Date: Jan. 3, 1997

[30] Foreign Application Priority Data

Jun. 14, 1995 [DE] Germany .......................... 195 21 671

[51] Int. Cl.$^7$ .................................................... C08G 75/00
[52] U.S. Cl. ............................................. 528/373; 528/480
[58] Field of Search ..................................... 528/373, 480

[56] References Cited

U.S. PATENT DOCUMENTS 2,548,718  4/1951  George et al. .......................... 252/153
5,371,111  12/1994  Unger et al. .............................. 521/40

FOREIGN PATENT DOCUMENTS 0 188 833   7/1986   European Pat. Off. .
0 549 025   6/1993   European Pat. Off. .
0 622 403   11/1994  European Pat. Off. .
11 31 012   6/1962   Germany .
41 42 500   5/1993   Germany .

OTHER PUBLICATIONS

Aliphatische Polysulfide, Heidelberg, p114 (1992).

*Primary Examiner*—Terressa M. Boykin
*Attorney, Agent, or Firm*—John E. Drach; Daniel S. Ortiz

[57] ABSTRACT

The invention relates to a process for recycling cured or partly cured polysulfide and/or polymercaptan compositions. Recycling is carried out in a non-volatile liquid with addition of a depolymerizing agent, preferably a sulfur-containing vulcanization accelerator known from rubber technology. The depolymerisate may be added to the curing component of two-component polysulfide and/or polymercaptan adhesives/sealants or coating materials in large quantities without any significant effect on its stability in storage or curing characteristics.

11 Claims, No Drawings

PROCESS FOR RECYCLING HARDENED POLYSULPHIDE AND/OR POLYMERCAPTAN ADHESIVES AND SEALANTS

BACKGROUND OF THE INVENTION

This invention relates to a process for recycling cured or partly cured polysulfide and/or polymercaptan polymer compositions.

One-component or multi-component compositions based on polysulfide polymers and/or polymercaptan polymers are used in civil engineering and building construction, in the aircraft or automotive industry, in shipbuilding and, on a large scale, in the manufacture of insulated glass. Both in the case of industrial application in automobile construction, in shipbuilding, in aircraft construction and in the manufacture of insulated glass, the sealants, adhesives or coating materials used accumulate as residual materials and waste in partly or completely cured form. Compositions based on polysulfide polymers and/or polymercaptans are distinguished in particular by their high resistance to light and ozone and by their resistance to numerous solvents and chemicals. For this reason, adhesives/sealants based on polysulfides or polymercaptans have long been used, for example, for the production of insulated glass (see, for example, H. Lucke, "Aliphatische Polysulfide", Heidelberg (1992), page 114).

In the case of one-component, systems, cured or partly cured residues are actually formed during production in the production plants; during processing, residues remain in the processing machines and processing containers. In the case of multi-component systems, partly or completely cured residues are formed in the material-carrying parts of processing machines, at the beginning of production or when the machines are switched off and when they are cleaned by "rinsing" and when excess quantities are removed during application to the structural components or vehicles. Non-reusable, solid elastomers hitherto disposed of as waste are also accumulating to an increasing extent at the end of the useful life of those parts in which the elastomers were used. Since polysulfides and—polymercaptans have already been in use for several decades as adhesives for the production of laminated insulated glass and as joint sealing compounds and coating materials in civil engineering and building construction, cured adhesives/sealants or coating materials which, hitherto, have had to be disposed as waste accumulate during rebuilding, renovation and dismantling.

Accordingly, there is a need for processes which enable these materials to be recycled.

DE-C-4142500 describes a process for recycling cured polysulfide and/or polymercaptan elastomers. According to this document, 0.5 to 400% by weight of cured elastomer are reacted in a liquid dimercapto or poly-mercapto compound to form liquid, paste-like mercapto-terminated pre-polymers and the prepolymers thus obtained are reused as polysulfide and/or polymercaptan sealing compounds. Although this method basically provides useful results, the stability in storage of the polysulfide component produced in this way is unsatisfactory. Thus, the formation of a thick skin of at least partly cured adhesive/sealant or coating material on the surface of the polysulfide-containing component is observed after only a relatively brief storage period, depending on the quantity of "recyclate" introduced. It is assumed that this hardening reaction is brought about by atmospheric oxygen in conjunction with the aminic constituents which have entered the polysulfide component through the recycling process.

Accordingly, there was a need to find an improved process for recycling cured polysulfide and/or polymercaptan compositions, in which the compositions containing the recycled products would not have any problems in regard to stability in storage.

DETAILED DESCRIPTION OF THE INVENTION

According to the invention, the solution to this problem is characterized in that the cured or partly cured polysulfide and/or polymercaptan polymer compositions are first depolymerized by a depolymerizing agent and the depolymerisate is subsequently incorporated in the curing component of two-component of multi-component polysulfide and/or polymercaptan compositions.

The degradation or partial degradation of polysulfide compositions by depolymerizing agents has been known for some time. Thus, U.S. Pat. No. 2,548,718 describes a composition for degrading coatings based on polysulfide elastomers. According to this document, a reaction product of one or more dialkylamines and carbon disulfide in solvents, for example ketones or halogenated hydrocarbons, is used to degrade polysulfide coatings. However, the degradation product is discarded as waste and is not recycled.

EP-B-188 833 describes a process for cleaning machinery soiled with polymer residues of rubber-like polysulfide elastomers. This process uses a mixture of an organic solvent, a chain-terminating agent or chain-degrading agent of mercaptofunctional compounds and an amine as reaction accelerator. According to the teaching of this document, the solvent used can be recycled whereas the fate of the degraded polymer residues is not discussed.

According to the invention, the cured or partly cured polysulfide and/or poly- mercaptan compositions are size-reduced and depolymerized in a low-viscosity non-volatile liquid to which the depolymerizing agent is added. Plasticizers are preferably used as the low-viscosity non-volatile liquid. In principle, any low-viscosity plasticizer may be used for this purpose, although it is preferred to use those plasticizers which are also used in curing pastes for two-component or multi-component polysulfide or polymercaptan systems.

Examples of such plasticizers are alkyl sulfonic acid esters of phenol/cresol, alkyl and/or aryl phosphates, dialkyl esters of aliphatic dicarboxylic acids and, in particular, dialkyl or aryl esters of phthalic acid. Benzyl butyl phthalate is most particularly preferred.

In principle, any depolymerizing agent may be used. According to the invention, the vulcanization accelerators known from rubber technology, including for example thiazole accelerators, thiurams, dithiocarbamates, dithiocarbamyl sulfenamides, xanthogenates, sulfur-containing triazine accelerators, thiourea derivatives or other basic sulfur compounds, are preferred. These depolymerizing agents may optionally be used in combination with other basic compounds, such as amines or guanidine compounds. In one particularly preferred embodiment, aqueous solutions of the salts of dithiocarbamates, xanthogenates, thiourea derivatives, thiazole derivatives or other basic sulfur compounds are used as depolymerizing agents.

The depolymerization is carried out with stirring in a vessel at temperatures of 0 to 100° C. and preferably at an elevated temperature of 50 to 90° C. Although generally not necessary, the depolymerization may even be carried out under pressure in an autoclave so that the temperatures may even be above 100° C. The advantage of this alternative lies in particularly short reaction times required for complete depolymerization.

Particularly preferred depolymerizing agents are approximately 40% aqueous solutions of salts of dithiocarbamic acid, for example sodium dimethyl dithiocarbamate. If a plasticizer of very low viscosity, for example benzyl butyl phthalate, is used as the liquid medium, the solutions/suspensions obtained after depolymerization have very low viscosities. The percentage content of material to be depolymerized in the mixture may thus be very high. 40 to 60% solutions/suspensions may be processed without significant difficulties.

Although, in principle, the resulting solution/suspension of the depolymerisate may also be incorporated in the so-called A component, it is preferred in accordance with the invention to incorporate the depolymerisate mixture in the so-called B component, i.e. the curing component. The A component is generally understood to be the component which contains the generally liquid polysulfide and/or polymercaptan polymer capable of undergoing the curing reaction. In addition to the polysulfide and/or polymercaptan polymers just mentioned, this component contains plasticizers, generally phthalic acid esters, for example benzyl butyl phthalate; fillers, for example coated and/or uncoated chalks (calcium carbonates, calcium magnesium carbonates), aluminium silicates, magnesium silicates, kaolin, heavy spar; thixotropicizing agents, for example Bentone (montmorillonite), pyrogenic silicas, fibrous thixotropicizing agents; pigments, for example titanium dioxide, carbon black and inorganic pigments; drying agents, for example molecular sieves, calcium oxide, barium oxide; the A component may also contain adhesion promoters, for example organofunctional trialkoxysilanes, and retarders, for example long-chain fatty acids (stearic acid and derivatives thereof), and also accelerators in the form of sulfur, magnesium acetate, thiurams, amines or guanidines.

In addition to the oxidizing agent acting as crosslinker, for example lead dioxide, manganese dioxide, sodium perborate or organic hydroperoxides, component B also contains plasticizers, fillers, retarders, pigments, sulfur, antiagers, optionally adhesion promoters based on organofunctional trialkoxy or dialkoxy alkyl silanes and accelerators, for example thiuram disulfides, guanidines, dithiocarbamates, and—according to the invention—between 2 and 80% by weight, preferably between 20 and 70% by weight and more preferably between 40 and 60% by weight of the depolymerisate.

It is new and completely surprising that the depolymerisates of polysulfides or polymercaptans can be used in the curing component, especially in such large quantities, without adversely affecting the curing reaction or the stability of the compositions in storage.

The process according to the invention affords two major advantages over the known recycling process, namely:

Firstly, there are no problems concerning stability in storage either in the case of the A component or in the case of the B component.

It is now standard practice in the technology of two-component polysulfide and/or polymercaptan compositions to produce component A in a light color. This is because component B is dark in color through the manganese dioxide predominantly in use today, component B being adjusted to an anthracite color tone by pigmentation. By visually evaluating the uniformity of color of the mixed adhesive/sealant composition or coating composition of components A and B, the user is able very easily to tell whether the curing the composition has been fully mixed. If the material to be recycled in incorporated in the A component, as proposed in DE-C-41 42 500, this component is darkened in color by the depolymerisate, so that there are limits to the quantity in which the A component can be taken up unless the user is prepared to relinquish the basically indispensible advantage of simple visual control of the mixing efficiency for the A:B mixture.

The following Examples are intended to illustrate the invention without limiting it in any way. In the Examples, the quantities in which the formulation constituents are used are parts by weight unless otherwise indicated.

EXAMPLES

Preparation of the Depolymerisate Solution/Suspension

The following components were introduced with stirring into a heatable stirred tank reactor equipped with a propeller stirrer: benzyl butyl phthalate, cured two-component adhesive/sealant based on polysulfide (Terostat 998 R, a product of Teroson GmbH), depolymerizing agent. These components were then heated with stirring at 80° C. until a homogeneous solution or suspension had formed, the polymer or its reaction product being completely dissolved in the plasticizer. The stability of the depolymerisate in storage was followed by viscosity measurements for up to 4 months after its production. The results are set out in Table 1 below.

TABLE 1

Production of the Recyclate

| Example | 1 | 2 | 3 | 4 | 5 | 6 | Comp. 1 | Comp. 2 | Comp. 3 |
|---|---|---|---|---|---|---|---|---|---|
| Terostat 998R.[1] Cured | 40 | 40 | 40 | 40 | 40 | 40 | 40 | 40 | 40 |
| Benzyl butyl phthalate | 57 | 56 | 56 | 56 | 55 | 55 | 56 | 57 | 59 |
| N,N,N,N-Tetramethyl guanidine | 1 | — | — | — | 1 | 1 | 1 | — | 1 |
| Mercaptosilane | — | — | — | — | — | — | 3 | 2 | — |
| Tetraethylene pentamine | — | — | — | — | — | — | — | 1 | — |
| Tetrabenzyl thiuram disulfide | 2 | — | — | — | — | — | — | — | — |
| Sodium dimethyl dithio-carbamate, 40% aqueous solution | — | 4 | — | — | — | — | — | — | — |
| Zinc dibutyl dithio-carbamate | — | — | 4 | — | 4 | — | — | — | — |
| Zinc dibenzyl dithio-carbamate | — | — | — | 4 | — | 4 | — | — | — |
| | 100.00 | 100.00 | 100.00 | 100.00 | 100.00 | 100.00 | 100.00 | 100.00 | 100.00 |
| Solubility at 80° C. after | 30 mins. | 4 h | 18 h | 6 h | 10 h | 10 h | 15 mins. | 40 mins. | 4 d |
| Viscosity (Pa · s)[2] | | | | | | | | | |
| Immediately after production | 0.5 | 1.34 | — | — | — | — | — | 0.6 | Re-gels |
| 24 h after production | — | 1.54 | 1.66 | — | 0.77 | 0.96 | — | 0.9 | |
| 3 d after production | 0.6 | 1.51 | 1.60 | 2.78 | — | — | — | Partly gels | |
| 7 d after production | 0.6 | 1.53 | — | — | — | — | 3.3 | — | |
| 14 d after production | 0.6 | 1.53 | 1.56 | 3.1 | 0.82 | 0.98 | | — | |
| 3 w after production | 0.7 | — | 1.57 | 3.2 | 0.87 | 1.02 | — | | |
| 4 w after production | — | 1.66 | — | — | — | — | | | |
| 5 w after production | — | 1.73 | 1.59 | 3.2 | 0.86 | 1.22 | — | | |
| 6 w after production | 0.8 | — | 1.70 | 3.4 | 0.97 | 1.11 | 6.74 | | |
| 3 m after production | 0.9 | 1.30 | 1.52 | 2.9 | 1.10 | 1.20 | 6.50 | | |
| 4 m after production | 0.6 | 1.35 | 1.00 | 2.2 | 0.60 | 1.00 | 6.1 | | |

Legend:
[1] Two component insulated glass adhesive/sealant based on polysulfide, a product of Teroson GmbH
[2] Physica rotational viscosimeter, measuring system MC10, at D = 100 1/s and room temperature
h = hour
d = day
w = week
m = month Preparation of Curing Pastes The curing pastes shown in Table 2 were prepared in a planetary mixer using the depolymerisates and then further homogenized on a three-roll stand.

TABLE 2

Preparation of the Curing Pastes

| Example | 7 | 8 | 9 |
|---|---|---|---|
| Recyclate of Example 1 | 43 | 50 | |
| Recyclate of Example 2 | | | 50 |
| Manganese dioxide | 23 | 23 | 23 |
| Benzyl butyl phthalate | 3.0 | 4.5 | 7.0 |
| Chalk, ground | 6.0 | — | — |
| Heavy spar | 10.7 | 10.0 | 6.54 |
| Filler/pigment mixture | 20.7 | 14.0 | 10.54 |
| Accelerator/retarder mixture[1] | 10.3 | 8.5 | 9.46 |
| Viscosity [Pa.s][2] | 358 | 172 | 139 |
| Immediately after preparation | | | |
| 24 d after preparation | 393 | 154 | — |
| 7 d after preparation | 413 | 191 | 165 |
| 2 w after preparation | 340 | — | 155 |
| 3 w after preparation | — | 207 | — |
| 4 w after preparation | 368 | — | 159 |
| 5 w after preparation | — | 144 | — |
| 6 w after preparation | — | 185 | — |
| 7 w after preparation | 348 | — | — |
| 8 w after preparation | 369 | 141 | 157 |
| 3 m after preparation | 270 | 160 | 130 |

[1] Consisting of sulfur, tetramethyl thiuram disulfide, dithiocarbamate, amine accelerators, water and isostearic acid.
[2] Physica rotational viscosimeter, measuring system PP30, at D = 5 1/s and room temperature.

Curing Tests:

The curing tests were carried out with the depolymerisate-containing curing pastes according to the invention prepared as described above and, for comparison, with a commercial curing paste (Terostat 998 R, component B, a product of Teroson GmbH). A commercially available adhesive/sealant (Terostat 998 R, component A, a product of Teroson GmbH) was used as component A. This adhesive/sealant is used for the production of laminated insulating glass. The test results are set out in Table 3 below.

As can be seen from Table 3, the properties (storage stability, pot life curing behavior) of the adhesive/sealant produced using the depolymerisate-containing curing paste are no different from those of adhesives/sealants produced using conventional curing pastes with no addition of depolymerisate.

It can be seen from Table 4 that the favorable adhesion behavior of the two-component adhesive/sealant produced using the recyclate-containing curing paste according to the invention on all standard substrates remains unaffected.

TABLE 3

| | Curing Behavior[1.)] | | | | | | | | | | | | |
|---|---|---|---|---|---|---|---|---|---|---|---|---|---|
| Example | 10 | 11 | 12 | 13 | 14 | 15 | 16 | 17 | 18 | 19 | C4 | C5 | C6 |
| Comp. B according to Example | 7 | 7 | 7 | 7 | 8 | 8 | 8 | 9 | 9 | 9 | B[2.)] | B[2.)] | B[2.)] |
| Tested after | 4 d | 4 w | 6 w | 8 w | 14 d | 4 w | | 24 h | 14 d | 4 w | 24 h | 14 d | 4 w |
| Pot life approx. (Hand-mixing [V], 23° C.) | 55 | 50 | 52 | 50 | 55 | 58 | 52 | 57 | 48 | 44 | 50 | 50 | 49 |
| Shore A after | | | | | | | | | | | | | |
| 1.5 h | 22 | 24 | 22 | 18 | 17 | 30 | 21 | 30 | 35 | 40 | 27 | 26 | 27 |
| 2.0 h | 36 | 38 | 25 | 31 | 31 | 43 | 32 | 40 | 43 | 42 | 37 | 37 | 40 |
| 2.5 h | 44 | 44 | 34 | 37 | 37 | 43 | 37 | 40 | 43 | 43 | 42 | 42 | 44 |
| 3.0 h | 40 | 46 | 37 | 41 | 40 | 46 | 42 | 47 | 43 | 43 | 42 | 43 | 44 |
| 4.0 h | 42 | 48 | 45 | 44 | 48 | 46 | 44 | 50 | 46 | 44 | 44 | 43 | 44 |
| 5.0 h | 45 | 50 | 47 | 46 | 48 | 48 | 46 | 50 | 48 | 44 | 45 | 45 | 45 |
| 24 h | 45 | 50 | 47 | 47 | 48 | 48 | 47 | 50 | 48 | 45 | 46 | 46 | 46 |
| 3 d | 46 | 50 | 48 | | 50 | 48 | | 43 | 48 | | 46 | 46 | 47 |

[1.)]A commercial two-component polysulfide adhesive/sealant (Terostat 998 R, a product of Teroson GmbH) was used as component A; mixing ratio A:B = 10:1 (by volume)
[2.)]Comparison tests with a commercially available component B (Terostat 998 R, a product of Teroson GmbH)

TABLE 4

| | Adhesion Test | | | | | |
|---|---|---|---|---|---|---|
| Example | 11 | 11 | 14 | 14 | 17 | 17 |
| Adhesion after | 24 h | 3 d | 24 h | 3 d | 24 h | 3 d |
| Glass | CF | CF | CF | CF | CF | CF |
| Aluminium | CF | CF | CF | CF | CF | CF |
| Galvanized steel plate | CF | CF | C/A 1:1 | CF | CF | CF |

In Examples 11 to 17 (Table 4), components A and B were mixed in a ratio by weight of 10:1. For the adhesion test, strands were applied to the substrates to be tested. They were peeled off by hand and the fracture pattern was evaluated. CF stands for cohesive failure while C/A stands for a mixed fracture pattern with cohesive components and partial loss of adhesion (ratio about 1:1).

In Comparison Examples 1 and 2, a recyclate was produced in accordance with EP-B-188 833. Comparison Example 3 was carried out on the basis of standard expert knowledge. Although, in all three Comparison Examples, the cured adhesive/sealant is degraded more or less quickly, the recyclate regels after only a relatively short time, presumably under the effect of atmospheric oxygen.

Unstable recyclates such as these are unsuitable for reuse. By contrast, the recyclates of Examples 1 to 6 according to the invention give pastes which remain stable in viscosity over a long period. By virtue of the short reaction time required, the procedures of Examples 1 and 2 are particularly advantageous.

As can be seen from Table 2, not only the recyclate pastes, but also the curing pastes produced from them remain stable in storage (stable in viscosity) over a long period.

Table 3 shows that the curing pastes produced in accordance with the invention—in relation to component A of a commercial polysulfide adhesive/sealant—are entirely equivalent in their curing behavior to a conventional component B curing paste according to the prior art.

What is claimed is:

1. A process for recycling cured or partly cured polysulfide and polymercaptan polymer compositions, comprising the steps of:

depolymerizing a polymer selected from the group consisting of polysulfides, polymercaptans and mixtures thereof with a depolymerizing agent to form a depolymerisate; and incorporating said depolymerisate in the curing component of a composition selected from the group consisting of two-component polysulfides, polymercaptans and mixtures thereof.

2. The process as claimed in claim 1, wherein said depolymerizing agent is a vulcanization accelerator.

3. The process as claimed in claim 2, wherein said vulcanization accelerator is selected from the group of thiazole accelerators, thiurams, dithiocarbamates, dithiocarbamyl sulfenamides, xanthogenates, sulfur-containing triazine accelerators, thiourea derivatives and mixtures thereof.

4. The process as claimed in claim 2, wherein said vulcanization accelerator is a basic sulfur compound.

5. The process as claimed in claim 1, wherein said depolymerizing agent is an aqueous solution of the salt of a vulcanization accelerator.

6. The process as claimed in claim 1, wherein the depolymerization step is carried out in a plasticizer.

7. The process as claimed in claim 1, wherein the depolymerization step is carried out at temperatures of about 0° C. to about 100° C.

8. Two-component or multi-component compositions based on polysulfides and polymercaptans, comprising a curing component comprising about 2 to about 80% by weight, of a depolymerisate produced by the process claimed in claim 1.

9. Two-component or multi-component compositions based on polysulfides and polymercaptans, comprising a curing component comprising about 20 to about 70% by weight of a depolymerisate produced by the process claimed in claim 1.

10. Two-component or multi-component compositions based on polysulfides and polymercaptans, comprising a curing component comprising about 40 to about 60% by weight of a depolymerisate produced by the process claimed in claim 1.

11. Compositions as claimed in claim 8, wherein the curing component further comprises an oxidizing agent selected from the group consisting of lead dioxide, manganese dioxide, compounds of hexavalent chromium and mixtures thereof.

* * * * *

UNITED STATES PATENT AND TRADEMARK OFFICE
CERTIFICATE OF CORRECTION

PATENT NO. : 6,117,971
DATED : September 12, 2000
INVENTOR(S) : Grimm et al.

It is certified that error appears in the above-identified patent and that said Letters Patent is hereby corrected as shown below:

Title page,
Item [86], PCT No., after "§ 371 Date:" and § 102(e) Date:", delete "Dec. 12, 1997" and insert therefor -- Feb. 5, 1999 --.

Signed and Sealed this

Twenty-sixth Day of July, 2005

JON W. DUDAS
*Director of the United States Patent and Trademark Office*